(12) United States Patent
Bolzacchini

(10) Patent No.: US 7,401,443 B2
(45) Date of Patent: Jul. 22, 2008

(54) MACHINE FOR STUFFING A FOOD PRODUCT IN A CASING

(75) Inventor: Giovanni Bolzacchini, Solarolo Di Goito (IT)

(73) Assignee: Inox Meccanica S.R.L., Goito (IT)

( * ) Notice: Subject to any disclaimer, the term of this patent is extended or adjusted under 35 U.S.C. 154(b) by 0 days.

(21) Appl. No.: 11/713,658

(22) Filed: Mar. 5, 2007

(65) Prior Publication Data

US 2007/0209321 A1    Sep. 13, 2007

(30) Foreign Application Priority Data

Mar. 10, 2006    (IT) .......................... MN2006A0017

(51) Int. Cl.
*B65B 61/14* (2006.01)
*B65B 51/04* (2006.01)
*A22C 11/12* (2006.01)
*A22C 15/00* (2006.01)

(52) U.S. Cl. .................... 53/134.1; 53/138.4; 53/139.4; 452/48; 452/51

(58) Field of Classification Search ............... 53/413, 53/417, 134.1, 138.1–138.4, 139.4; 452/35, 452/48, 51; *B65B 61/14, 51/04; A22C 11/12, A22C 15/00*

See application file for complete search history.

(56) References Cited

U.S. PATENT DOCUMENTS

| | | | | |
|---|---|---|---|---|
| 4,044,450 A | * | 8/1977 | Raudys et al. | 29/509 |
| 4,227,668 A | * | 10/1980 | Ernst | 248/317 |
| 4,324,086 A | * | 4/1982 | Niedecker | 53/134.1 |
| 4,612,684 A | * | 9/1986 | Kollross | 452/35 |
| 4,694,537 A | * | 9/1987 | Kollross | 452/48 |
| 5,100,364 A | * | 3/1992 | Kollross et al. | 452/185 |
| 5,109,648 A | * | 5/1992 | Evans | 53/134.1 |
| 5,165,216 A | * | 11/1992 | May et al. | 53/413 |
| 5,269,116 A | | 12/1993 | Roberts et al. | |
| 5,699,723 A | * | 12/1997 | Schliesser et al. | 452/48 |
| 5,755,022 A | * | 5/1998 | Whittlesey | 29/788 |

FOREIGN PATENT DOCUMENTS

| | | |
|---|---|---|
| EP | 0 424 675 A1 | 5/1991 |
| EP | 0 498 127 A1 | 8/1992 |
| WO | WO 92/03929 A | 3/1992 |

* cited by examiner

*Primary Examiner*—Stephen F Gerrity
(74) *Attorney, Agent, or Firm*—Modiano & Associati; Albert Josif; Daniel J. O'Byrne

(57) ABSTRACT

A machine for stuffing a food product in a casing, comprising a clipping unit which is adapted to apply two clips with an intermediate cut at the trailing end of a product introduced in a casing and comprising a device for inserting ties which are supported by a ribbon which moves stepwise, moving progressively the ties, one after the other, to a clipping standby position, in which the tie is available for being engaged by a clip in its motion from the magazine to the closure position, a bar being provided which is adapted to be associated with the tie in its movement from the clipping standby position.

7 Claims, 5 Drawing Sheets

MACHINE FOR STUFFING A FOOD PRODUCT IN A CASING

BACKGROUND OF THE INVENTION

It is known that there are machines for stuffing food products, such as for example salamis or bacons, in a casing commonly constituted by a net or intestine-derived casing.

Such machines comprise a clipping unit, which is adapted to apply two clips with an intermediate cut at the trailing end of a product which has been introduced in the casing and also comprise a device for inserting ties formed by a piece of string which is closed in a loop and can have different constructive embodiments.

In the commonly adopted form, such ties are supported by a ribbon which moves stepwise in contact with a fixed guide which has one end proximate to the clipping unit and in this way one tie after the other is arranged, thanks to the motion of the ribbon which proceeds in contact with the lower face of the guide, turns back at the end and comes into contact with the upper face of said guide, in a standby position with a forward portion separated from the ribbon which protrudes from the end of the guide, while a retracted portion is still in contact with the ribbon.

The tie in the standby position is thus made available for being taken by a clip, which at the appropriate time exits from the magazine of the clipping unit and is closed on the casing at the trailing end of the product with the tie inserted therein, and in this way each product is provided with a tie which allows to hang the product from bars provided in storage rooms.

As mentioned, the same result can be achieved by devices for inserting ties having a different configuration with respect to the one described.

Currently, the operation of hanging each individual product on the bars is performed manually, with an easily imaginable expenditure of labor, and therefore the aim of the present invention is to provide a stuffing machine which arranges the products in output so that the corresponding ties are all aligned, thereby allowing insertion in means which are adapted to automate the operation.

SUMMARY OF THE INVENTION

This aim and object are achieved by a machine for stuffing a food product in a casing, characterized in that it comprises the features disclosed in the appended claims.

BRIEF DESCRIPTION OF THE DRAWINGS

Further characteristics and advantages of the invention will become better apparent from the description of a preferred but not exclusive embodiment thereof, illustrated by way of non-limiting example in the accompanying drawings, wherein.

DESCRIPTION OF THE PREFERRED EMBODIMENTS

Figure 1:
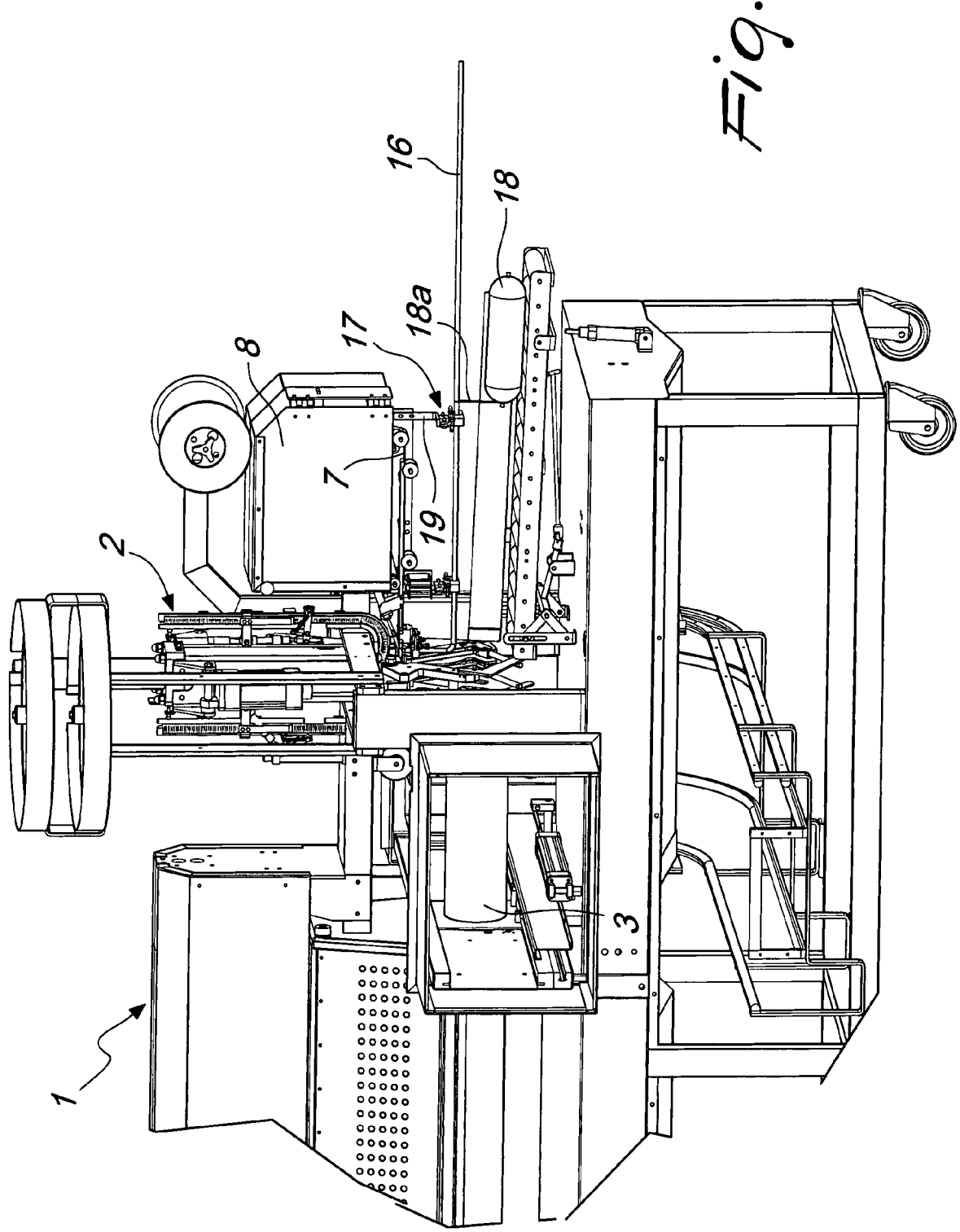
FIG. 1 is a view of the region of the machine according to the invention.

With reference to the figures, the reference numeral 1 generally designates the stuffing machine according to the invention, which comprises a clipping unit 2, which is adapted to apply two clips with an intermediate cut at the trailing end of a product in output from a tube 3, which is designed to support the casing but is shown in FIG. 1 without such casing for the sake of clarity of illustration, when the product is inserted completely in the casing which, as mentioned, is commonly formed by a net or an intestine.

Figure 4:
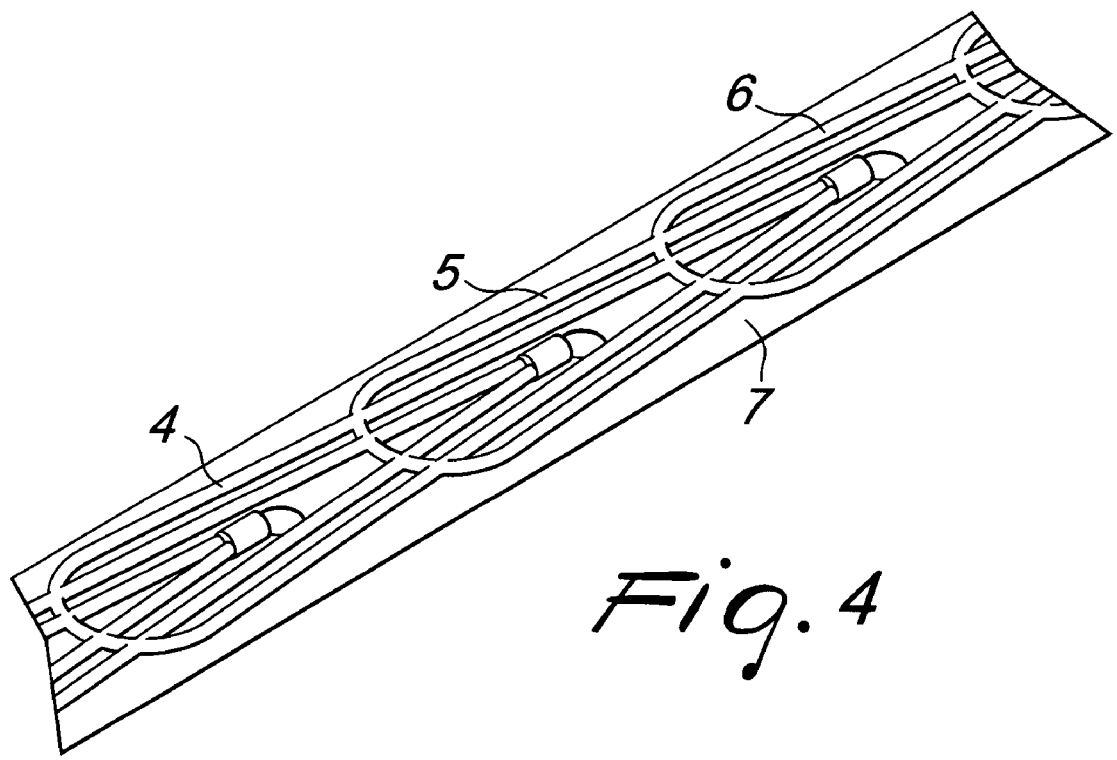
FIG. 4 is a view of a portion of a tie supporting ribbon.

A device is also provided for inserting ties, constituted by a piece of string closed in a loop applied to a supporting ribbon 4, 5, 6 on a ribbon 7 (FIG. 4).

The ribbon 7 moves stepwise, exiting from a magazine 8, comes into contact with the lower face of a fixed guide 9 which has an end 9a protected by plates 9b, 9c located proximate to the clipping unit 2, winds around said end, and returns into the magazine 8, moving in contact with the upper face of the guide 9.

Figure 3:
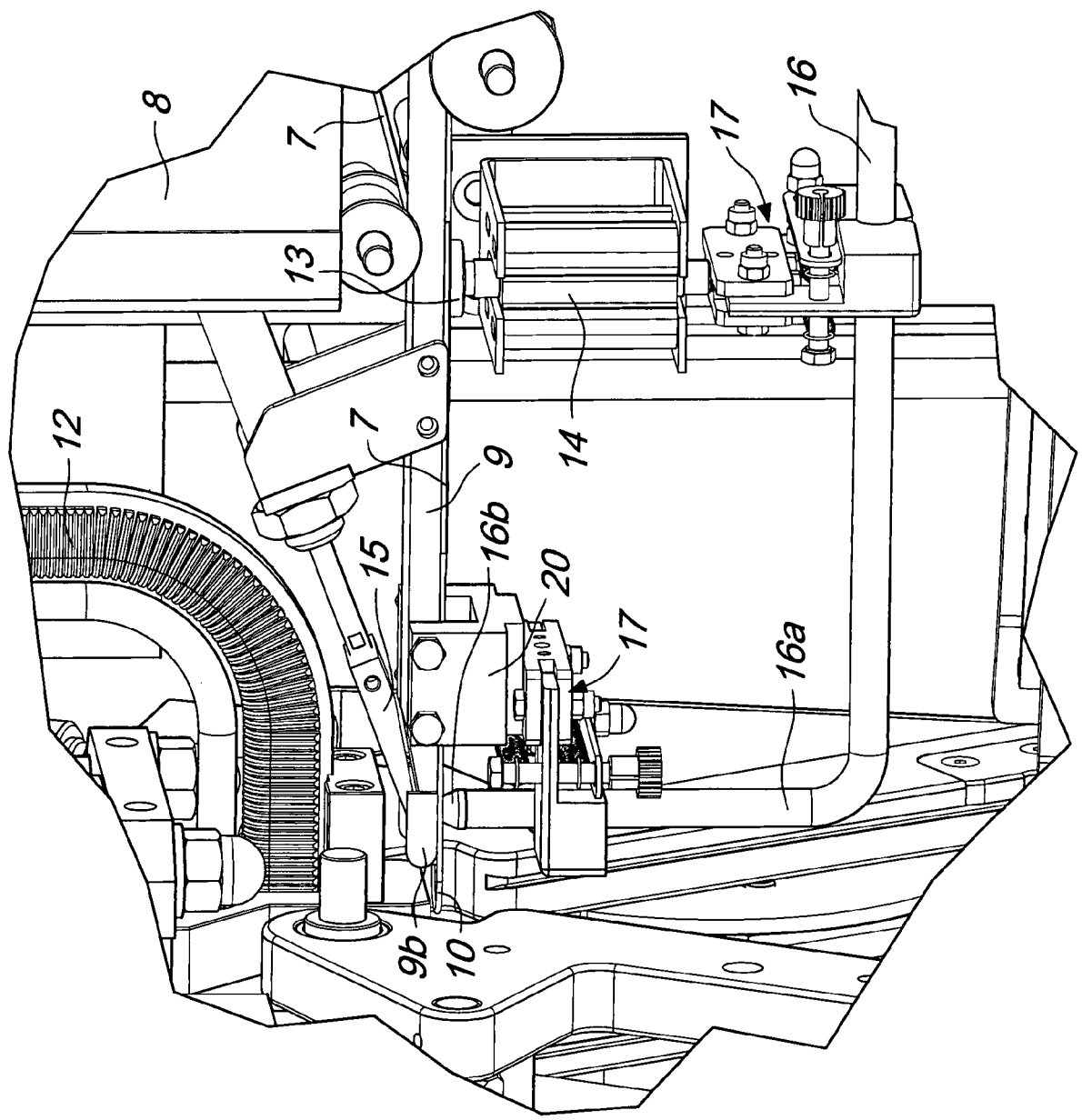
FIG. 3 is a view of the same detail of FIG. 2 during standby for clipping.
Figure 5:
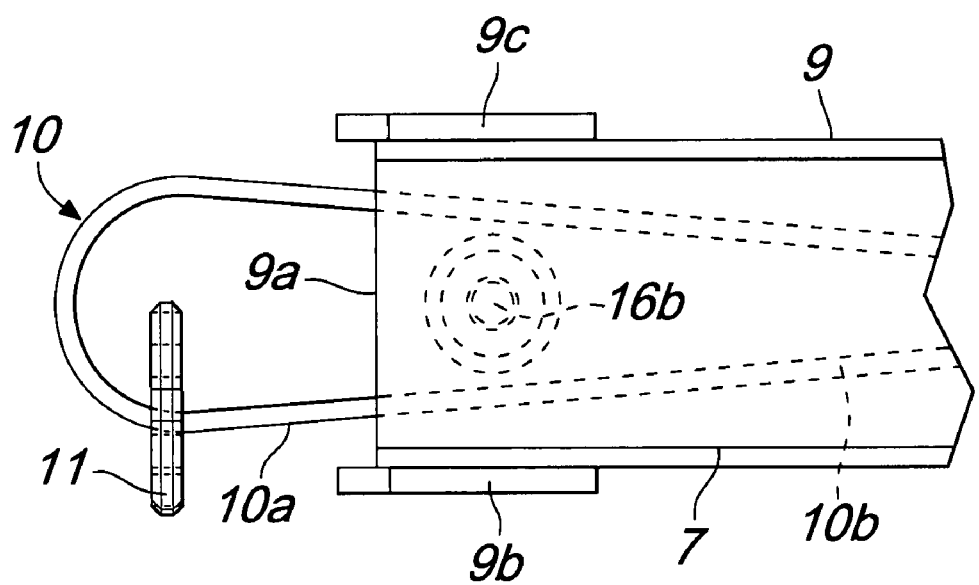
FIG. 5 is a schematic top view of the end of the guide of the tie supporting ribbon.

In this manner, one tie after the, other is arranged in a standby position, as occurs for a tie 10 shown in FIGS. 3 and 5, which protrudes from the end 9a of the guide with a forward portion 10a which is separated from the ribbon, while a backward portion 10b is still in contact with the ribbon.

A tie 10 in the standby position can thus be arranged so as to be taken by a clip 11, which at the appropriate time exits from a magazine 12 of the clipping unit and is closed on the casing with said tie inserted therein.

Figure 2:
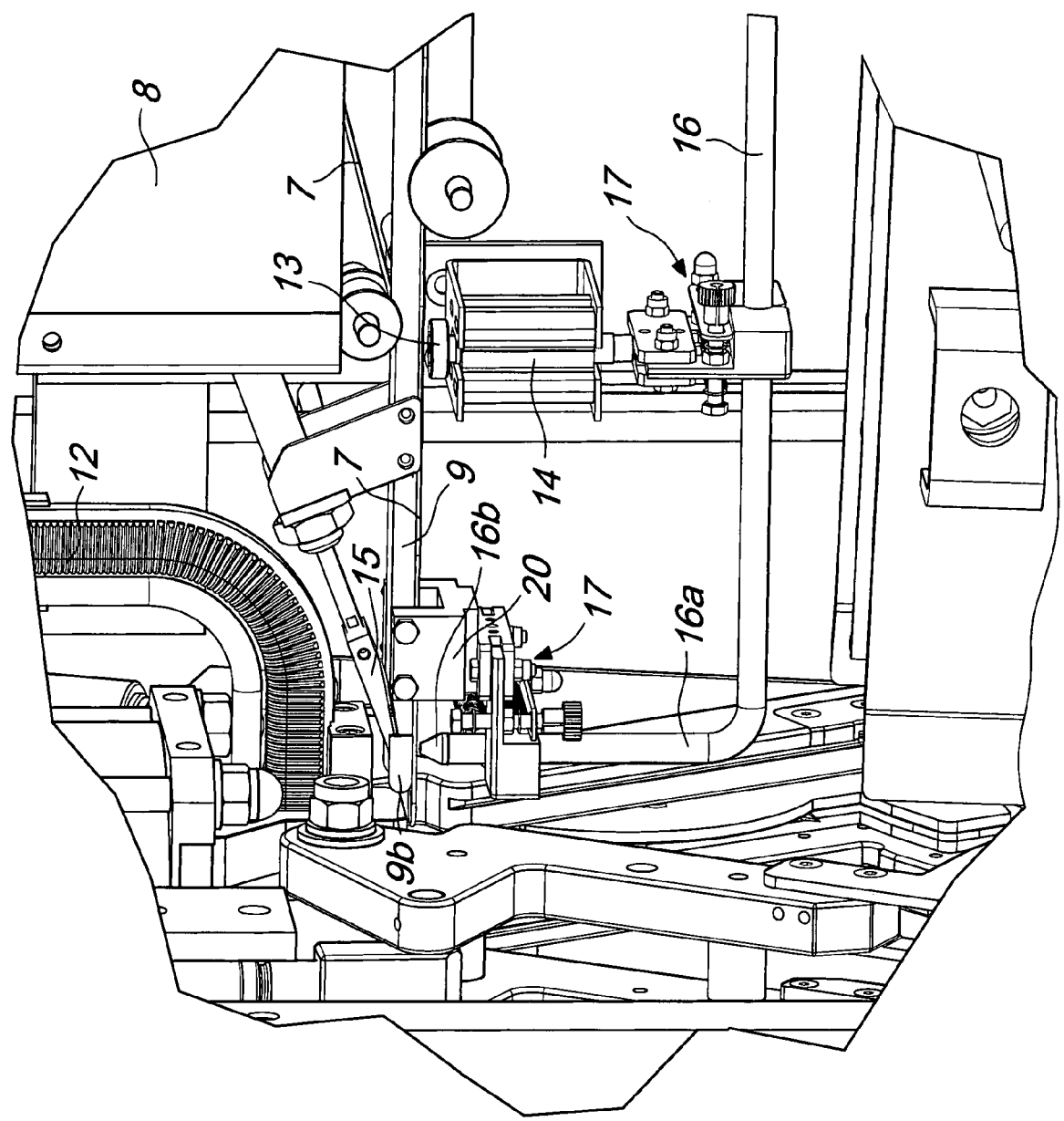
FIG. 2 is a view of a detail of FIG. 1 during a step of the translational motion of the tie supporting ribbon.

A pad 13 is moved by an actuation cylinder 14 so as to move from a position for separation from the ribbon 7, shown in FIG. 2, which is maintained during the stepwise movement of the ribbon, to a position of FIG. 3, in which the ribbon 7 is compressed against the guide 9, so as to block the ribbon during clipping standby; a similar function is performed by the presser 15.

An important feature of the machine according to the invention consists in the presence of a bar 16, which is straight and is bent at a portion 16a proximate to an end 16b, which is associated, by way of connecting means generally designated by the reference numeral 17 and described hereafter, to an actuation cylinder 14 which actuates the pad 13, so that it is moved simultaneously with such pad between a position, shown in FIG. 2, in which the end 16b separates from the ribbon 7, and a position shown in FIGS. 3 and 5, in which the end 16b is in contact with the ribbon 7 which is pressed against the guide 9 in a position, as clearly shown by FIG. 5, comprised within the backward portion 10b of the tie 10 in the standby position.

In this manner, the tie 10, when it descends by being guided by the clip 11 so as to be closed onto the product, is already fitted on the bar 16, which will convey it during the exit motion of the product from the machine, as shown for a product 18 with a corresponding tie 18a shown in FIG. 1, and this occurs for all the products that follow each other, thus achieving the alignment of all the ties of the products.

Figure 6:
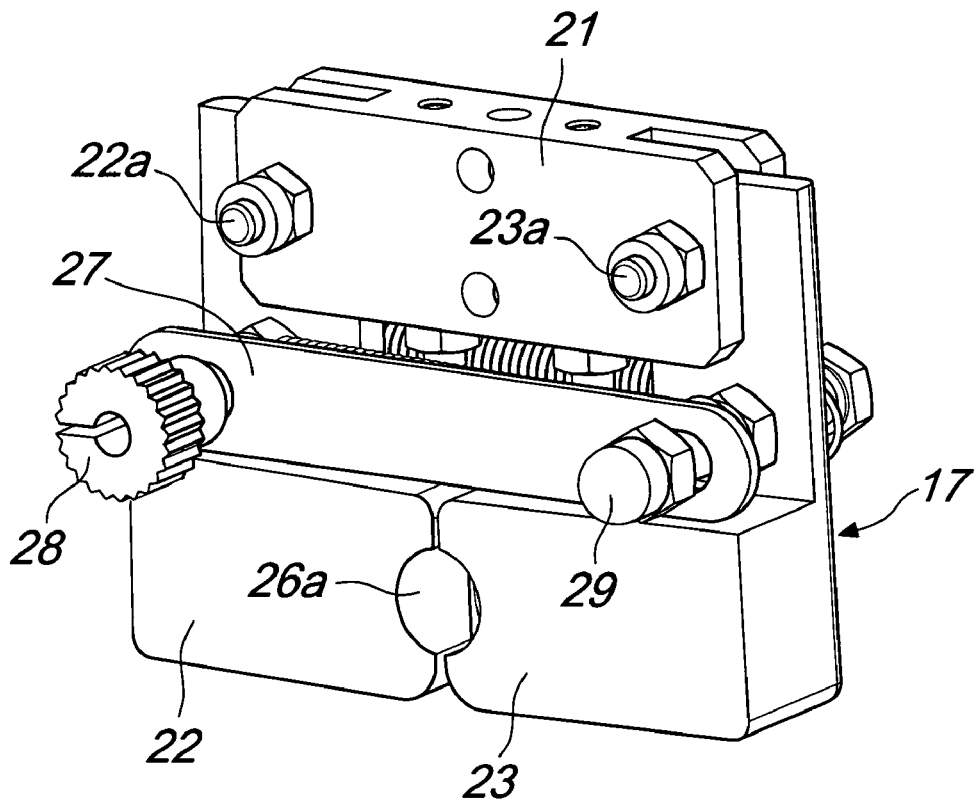
FIGS. 6 and 7 are views of the means for connecting the bar.
Figure 7:
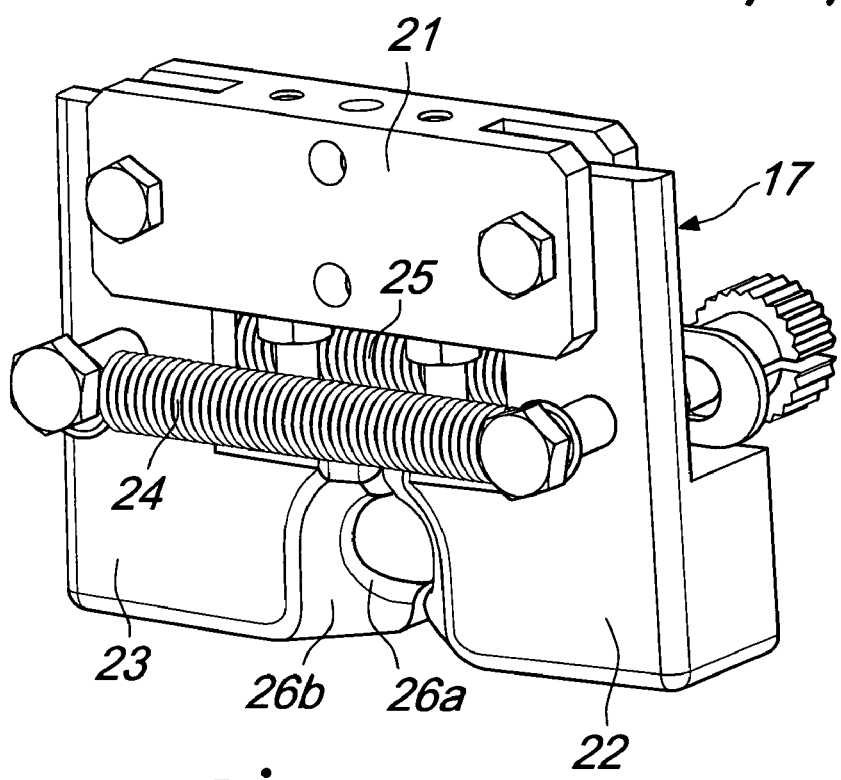

As mentioned, the bar 16 is associated with the actuation cylinder 14 by way of connection means 17, and by way of identical means, described now in detail with reference to FIGS. 6 and 7, the bar 16 is associated with the fixed supports 19 and 20.

Such connection means therefore comprise a crosspiece 21, which is designed to be fixed to the supports 19 and 20 and to the stem of the cylinder 14 and is provided with two jaws 22, 23 which are pivoted thereon at 22a, 23a and are kept, by the action of springs 24, 25, in mutual contact at a portion 26a for gripping the bar 16 which is located at the end of a portion 26b for guiding the passage of a tie, which can thus pass by sliding in contact with the bar; a plate 27 associated by means of slots with the shanks of screws 28, 29 associated with the jaws 22, 23 acts as a limiter for the stroke of the jaws so as to prevent an excessive opening thereof which might lead to disengagement of the bar 16.

The described invention is susceptible of numerous modifications and variations, all of which are within the scope of the appended claims, in order to be adapted to any commercially available type of device for fitting ties; all the details may further be replaced with other technically equivalent elements.

The disclosures in Italian Patent Application No. MN2006A000017 from which this application claims priority are incorporated herein by reference.

What is claimed is:

1. A machine for stuffing a food product in a casing, comprising:
   a clipping unit which is adapted to apply two clips with an intermediate cut at a trailing end of a product introduced in a casing;
   a tie insertion device for inserting ties which are supported by a ribbon of said tie insertion device which moves stepwise, moving progressively the ties, one after the other, to a clipping standby position, in which the tie is available for being engaged by a clip in its motion from a magazine of the clipping unit to a closure position on the casing at a trailing end of the product with said tie inserted in said clip;
   a tie conveyance bar which extends longitudinally for receiving a plurality of ties each inserted in a respective clip closed about a respective product such that said plurality of ties slides successively along said tie conveyance bar, said tie conveyance bar being arranged such that a free end thereof is positioned with respect to said ribbon of said tie insertion device such that each of said plurality of ties is directly fed on said tie conveyance bar at said free end thereof by means of the motion of each respective clip from said magazine of said clipping unit, said tie conveyance bar moving in synchronized movement with the stepwise movement of said ribbon of said tie insertion device such that said free end of said tie conveyance bar moves between a position in which said free end is in direct contact with said ribbon at a position on said ribbon arranged inside a trailing loop portion of a respective tie arranged in the clipping standby position of the respective tie, and a position in which said free end is spaced from said ribbon.

2. The machine according to claim 1, wherein said tie conveyance bar comprises a substantially horizontal portion and a substantially vertical portion extending from a bent elbow portion, said free end of said tie conveyance bar being arranged upwardly of said vertical portion.

3. The machine according to claim 2, further comprising an actuation cylinder for vertically moving said tie conveyance bar.

4. The machine according to claim 3, further comprising a pad for pressing on said ribbon, said pad being connected to said tie conveyance bar and being moved vertically therewith by means of said actuation cylinder.

5. A machine for stuffing a food product in a casing, comprising a clipping unit which is adapted to apply two clips with an intermediate cut at a trailing end of a product introduced in a casing and comprising a device for inserting ties which are supported by a ribbon which moves stepwise, moving progressively the ties, one after the other, to a clipping standby position, in which the tie is available for being engaged by a clip in its motion from a magazine of the clipping unit to a closure position on the casing at a trailing end of the product with said tie inserted therein, wherein a bar is provided which is adapted to be associated with the tie in its movement from the clipping standby position, wherein said device for inserting ties which are supported by the ribbon which moves stepwise in contact with a fixed guide which has one end located proximate to the clipping unit, so that one tie after the other, thanks to the motion of the ribbon which proceeds in contact with a lower face of a flat guide supporting a plurality of ties and extending in a direction perpendicular to the direction of feed of the clips into the closure position from said magazine, which ribbon then turns back at the end and moves into contact with an upper face of said guide, is in a standby position with a forward portion which is separated from the ribbon which protrudes from the end of the guide while a backward portion is still in contact with said ribbon, said tie in the standby position being available to be engaged by a clip, which at the appropriate time exits from the magazine of the clipping unit and is closed onto the casing at the trailing end of the product with said tie inserted therein, said bar being bent at one end and being connected to supporting means and to means for movement between a first position, in which said bent end is in contact with the supporting ribbon of the ties which rests on the lower face of the guide in a position within the backward portion of the tie in the standby position, and a second position for separating said end from said ribbon, said bar being connected to said supporting means and said movement means by way of means which are adapted to allow the passage of a tie in contact with the bar.

6. A machine for stuffing a food product in a casing, comprising a clipping unit which is adapted to apply two clips with an intermediate cut at a trailing end of a product introduced in a casing and comprising a device for inserting ties which are supported by a ribbon which moves stepwise, moving progressively the ties, one after the other, to a clipping standby position, in which the tie is available for being engaged by a clip in its motion from a magazine of the clipping unit to a closure position on the casing at a trailing end of the product with said tie inserted therein, wherein a bar is provided which is adapted to be associated with the tie in its movement from the clipping standby position where said device for inserting ties which are supported by the ribbon which moves stepwise in contact with a fixed guide which has one end located proximate to the clipping unit, so that one tie after the other, thanks to the motion of the ribbon which proceeds in contact with a lower face of a guide and then turns back at the end and moves into contact with an upper face of said guide, is in a standby position with a forward portion which is separated from the ribbon which protrudes from the end of the guide while a backward portion is still in contact with said ribbon, said tie in the standby position being available to be engaged by a clip, which at the appropriate time exits from the magazine of the clipping unit and is closed onto the casing at the trailing end of the product with said tie inserted therein, said bar being bent at one end and being connected to supporting means and to means for movement between a first position, in which said bent end is in contact with the supporting ribbon of the ties which rests on the lower face of the guide in a position within the backward portion of the tie in the standby position, and a second position for separating said end from said ribbon, said bar being connected to said supporting means and said movement means by way of means which are adapted to allow the passage of a tie in contact with the bar, the device further comprising a cylinder for the actuation of a pad which is adapted to compress the tie supporting ribbon against the lower face of the guide in the clipping standby steps, in order to move to a separation position during the ribbon advancement steps, said bar also being connected to said actuation cylinder.

7. A machine for stuffing a food product in a casing, comprising a clipping which is adapted to apply two clips with an intermediate cut at a trailing end of a product introduced in a casing and comprising a device for inserting ties which are supported by a ribbon which moves stepwise, moving progressively the ties, one after the other, to a clipping standby position, in which the tie is available for being engaged by a clip in its motion from a magazine of the clipping unit to a closure position on the casing at a trailing end of the product with said tie inserted therein, wherein a bar is provided which is adapted to be associated with the tie in its movement from the clipping standby position, wherein said device for inserting ties which are supported by the ribbon which moves stepwise in contact with a fixed guide which has one end located proximate to the clipping unit, so that one tie after the other, thanks to the motion of the ribbon which proceeds in contact with a lower face of a guide and then turns back at the end and moves into contact with an upper face of said guide, is in a standby position with a forward portion which is separated from the ribbon which protrudes from the end of the guide while a backward portion is still in contact with said ribbon, said tie in the standby position being available to be engaged by a clip, which at the appropriate time exits from the magazine of the clipping unit and is closed onto the casing at the trailing end of the product with said tie inserted therein, said bar being bent at one end and being connected to supporting means and to means for movement between a first position, in which said bent end is in contact with the supporting ribbon of the ties which rests on the lower face of the guide in a position within the backward portion of the tie in the standby position, and a second position for separating said end from said ribbon, said bar being connected to said supporting means and said movement means by way of means which are adapted to allow the passage of a tie in contact with the bar, wherein the means for connecting the bar to the supporting means and said movement means comprise a crosspiece which is designed to be fixed to said support and movement means and is provided with two jaws which are pivoted thereon and are kept, by the action of a spring, in mutual contact at a bar grip portion which is located at the end of a portion for guiding the passage of a tie, an element for limiting the opening of said jaws being provided.

* * * * *